(12) United States Patent
Hui et al.

(10) Patent No.: US 9,191,118 B2
(45) Date of Patent: Nov. 17, 2015

(54) BIDIRECTIONAL OPTICAL DATA COMMUNICATIONS MODULE

(71) Applicant: Avago Technologies General IP (Singapore) Pte. Ltd., Singapore (SG)

(72) Inventors: David Chak Wang Hui, Santa Clara, CA (US); Xiaozhong Wang, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 120 days.

(21) Appl. No.: 13/796,940

(22) Filed: Mar. 12, 2013

(65) Prior Publication Data

US 2014/0270778 A1   Sep. 18, 2014

(51) Int. Cl.
  *H04B 10/40*  (2013.01)
  *G02B 6/26*  (2006.01)
  *H04B 10/00*  (2013.01)
  *H04B 10/25*  (2013.01)

(52) U.S. Cl.
  CPC ............ *H04B 10/40* (2013.01); *H04B 10/2503* (2013.01)

(58) Field of Classification Search
  CPC .. G02B 6/4246; G02B 6/4291; H04B 10/801; H04B 10/40; H04B 10/1143
  USPC .............................................. 398/79, 43, 135
  See application file for complete search history.

(56) References Cited

U.S. PATENT DOCUMENTS

| | | | | |
|---|---|---|---|---|
| 5,457,558 A | * | 10/1995 | Yokoyama | 398/181 |
| 7,412,170 B1 | | 8/2008 | Louderback et al. | |
| 7,556,439 B2 | * | 7/2009 | Nakanishi et al. | 385/92 |
| 7,945,169 B2 | * | 5/2011 | Oki et al. | 398/135 |
| 8,032,032 B2 | | 10/2011 | Chand et al. | |
| 8,160,451 B2 | * | 4/2012 | Liu et al. | 398/138 |
| 8,235,605 B2 | | 8/2012 | Kim | |
| 8,641,298 B2 | * | 2/2014 | Lim et al. | 385/92 |
| 2005/0105844 A1 | * | 5/2005 | Katsuyama et al. | 385/24 |
| 2006/0083514 A1 | * | 4/2006 | Liu et al. | 398/85 |
| 2006/0088255 A1 | * | 4/2006 | Wu et al. | 385/92 |
| 2010/0054751 A1 | * | 3/2010 | Murry et al. | 398/137 |
| 2010/0209103 A1 | | 8/2010 | Sakigawa et al. | |

OTHER PUBLICATIONS

Kern, et al., "Single-Fiber Bidirectional Optical Data Links with Monolithic Transceiver Chips," Advances in Optical Technologies, vol. 2012 (2012).

Han, et al., "Low Cost Integrated Optical Mux/Demux for LX4 Transceiver," IEEE Optical Fiber Communication and Optoelectronics Conference 2007 Asia, pp. 561-563 (2007).

* cited by examiner

*Primary Examiner* — Oommen Jacob (57) ABSTRACT

An optical transceiver module includes N light sources, N light detectors, a bidirectional fiber port, and an optical network having 2N−1 wavelength-selective elements. The number 2N represents the total number of transmit and receive channels in a bidirectional system in which transmit and receive signals corresponding to the transmit and receive channels. Each light source corresponds to one transmit channel and emits an optical transmit signal having a unique transmit wavelength. Each light detector corresponds to one receive channel and detects an optical receive signal having a unique receive wavelength. The optical network couples each light source to the bidirectional fiber port via a corresponding transmit path through the optical network. The optical network further couples each light detector to the bidirectional fiber port via a corresponding receive path through the optical network. Each transmit and receive path includes some of the wavelength-selective elements.

20 Claims, 4 Drawing Sheets

BIDIRECTIONAL OPTICAL DATA COMMUNICATIONS MODULE

BACKGROUND

In data communications systems, it is often useful to modularize interface electronics and other interface elements in a data communication module. For example, in an optical data communication system, an optical data transceiver module may include a light source such as a laser, and a light detector such as a photodiode, and may also include driver and receiver circuitry associated with the laser and photodiode. The laser and associated circuitry convert electrical signals that the module receives via electrical contacts into optical signals that the module outputs via one or more optical fibers. The photodiode and associated circuitry convert optical signals received via the one or more optical fibers into electrical signals that the module outputs via the electrical contacts.

Generally, there are two types of semiconductor laser devices: edge-emitting lasers and Vertical Cavity Surface Emitting Lasers (VCSELs). An advantage of VCSELs is that they can be tested economically at wafer level rather than chip level. Another advantage of VCSELs is their well-defined spot size, which promotes high coupling efficiency to optical fibers without the need to provide beam shape correction, thus facilitating economical packaging. Edge-emitting lasers also have advantages, such as high output optical power. Edge-emitting lasers remain the most commonly used laser in long-distance high-speed optical data transceivers.

An optical data transceiver module may be of a bidirectional type that transmits a modulated optical transmit signal having a first wavelength via an optical fiber and receives a modulated optical receive signal having a second wavelength via the same optical fiber. Such a module generally includes a wavelength-selective filter (also referred to as a beam splitter) to separate the transmit signal and the receive signal.

Coarse wavelength division multiplexing (CWDM) is a technique by which a single optical fiber can simultaneously carry two or more communication channels, each characterized by a unique wavelength. A CWDM optical transceiver module commonly interfaces with at least one fiber that carries two or more outgoing or transmit channels and at least one other fiber that carries two or more incoming or receive channels. The CWDM optical transceiver modules that are currently commercially available generally have either four or eight channels. One type of optical multiplexer that has been suggested for use in a CWDM optical transceiver module includes four edge-emitting lasers, four corresponding narrowband optical filters, and three reflectors that redirect optical signals from one optical filter to another in a daisy-chain fashion. The four edge-emitting lasers must be precisely aligned so that their emitted signals that bounce among the reflectors and filters are ultimately coupled into the end of the fiber. The multiple bounces that some of the optical signals experience results in significant insertion loss. The difficulty in achieving sufficiently precise laser alignment and filter passbands can result in low manufacturing yield.

It would be desirable to provide a wavelength-multiplexed optical transceiver module that has low insertion loss and high manufacturing yield.

SUMMARY

Embodiments of the present invention relate to an optical transceiver module and method by which it operates. In an exemplary embodiment, an optical transceiver module includes N light sources, N light detectors, a bidirectional optical fiber port connectable to an optical fiber, and an optical network that includes 2N−1 wavelength-selective optical elements, where N is an integer power of two that is greater than or equal to two. The number 2N (which is thus likewise an integer power of two that is greater than or equal to four) represents the total number of transmit and receive channels in a bidirectional system in which transmit and receive signals corresponding to the transmit and receive channels are communicated via the optical fiber. Each light source corresponds to one transmit channel and is configured to emit an optical transmit signal having a unique transmit wavelength, i.e., a wavelength that is different from the transmit wavelengths of all others of the light sources. Each light detector corresponds to one receive channel and is configured to detect an optical receive signal having a unique receive wavelength, i.e., a wavelength that is different from the receive wavelengths of all others of the light detectors.

The optical network couples each light source to the bidirectional optical fiber port via a corresponding transmit path through the optical network. The optical network further couples each light detector to the bidirectional optical fiber port via a corresponding receive path through the optical network. Each transmit and receive path includes some of the wavelength-selective elements.

In the exemplary embodiment, a method for optical communication in the above-described optical transceiver module includes: each light source emitting an optical transmit signal that corresponds to one transmit channel and that has a transmit wavelength different from the transmit wavelengths of all others of the light sources; each light detector detecting an optical receive signal that corresponds to one receive channel and that has a receive wavelength different from the receive wavelengths of all others of the light detectors; each optical transmit signal propagating through the first optical network from one light source to the first bidirectional optical fiber port via a corresponding transmit path through the optical network; transmitting each optical transmit signal from the bidirectional optical fiber port via the optical fiber coupled to the bidirectional optical fiber port; receiving each optical receive signal at the bidirectional optical fiber port via the optical fiber; and each optical receive signal propagating through the optical network from the bidirectional optical fiber port to one of the light detectors via a corresponding receive path through the first optical network.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

DETAILED DESCRIPTION

Figure 1:
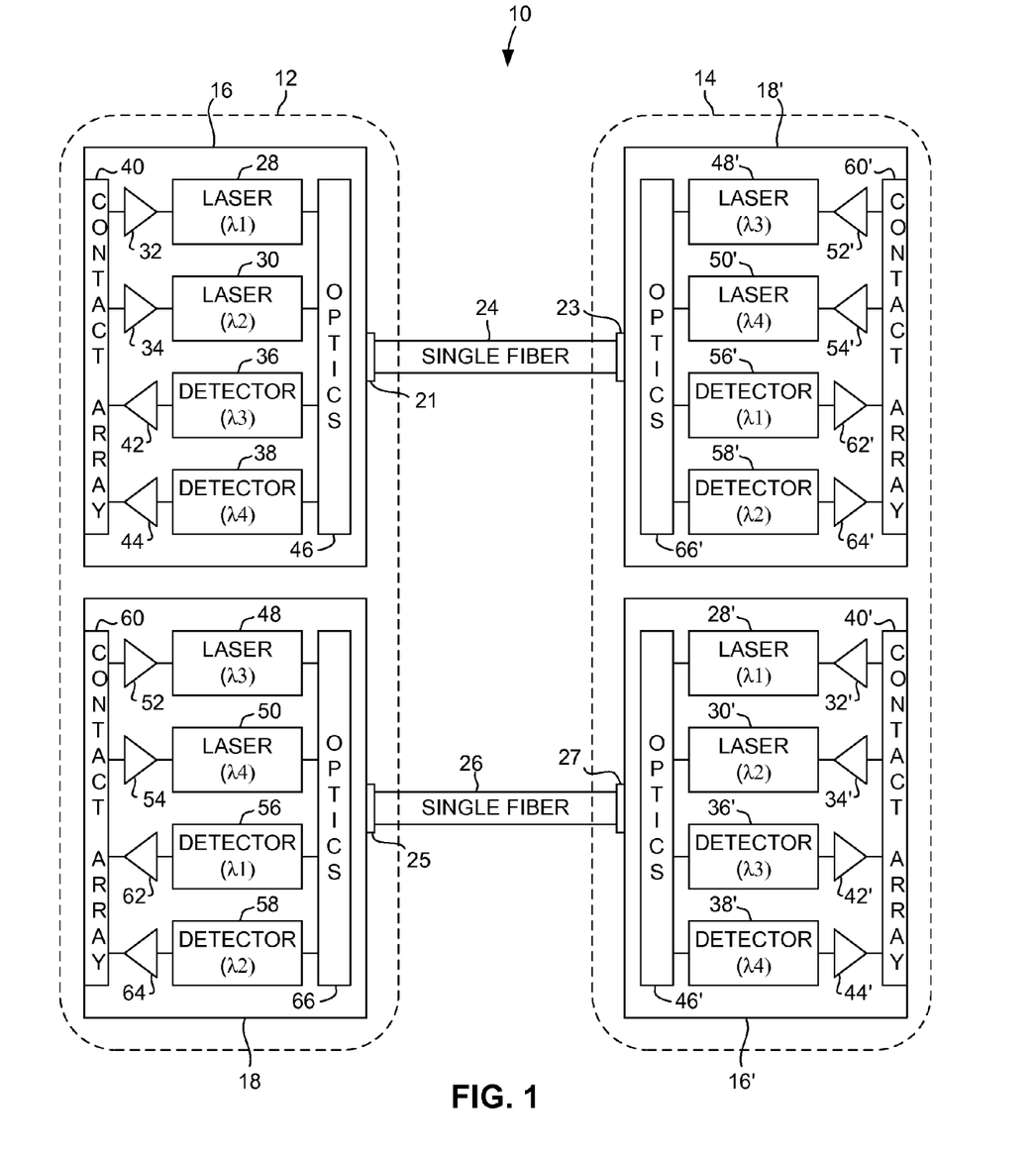
FIG. 1 is a schematic diagram of an optical communication system, in accordance with an exemplary embodiment of the invention.

As illustrated in FIG. 1, in an illustrative or exemplary embodiment of the invention, an optical communication system 10 includes a first portion 12 located remotely from a second portion 14. First portion 12 includes a first portion first transceiver 16 and a first portion second transceiver 18, which can be located together with each other (e.g., within a first transceiver housing). Second portion 14 includes a second portion first transceiver 18' and a second portion second transceiver 16', which can be located together with each other (e.g., within a second transceiver housing). First portion first transceiver 16 and second portion first transceiver 18' are capable of communicating bidirectionally with each other via a single optical fiber 24. The ends of optical fiber 24 are connected to respective optical fiber ports 21 and 23 of first transceivers 16 and 18'. First portion second transceiver 18 and second portion second transceiver 16' are capable of communicating bidirectionally with each other via a single optical fiber 26. The ends of optical fiber 26 are connected to respective optical fiber ports 25 and 27 of second transceivers 18 and 16'.

As described in further detail below, in the exemplary embodiment optical communication system 10 has four channels. Each channel is characterized by a unique wavelength, and optical fibers 24 and 26 carry the channels in a wavelength-multiplexed manner. First portion 12 can transmit optical data signals on any of the four channels and receive optical data signals on any of the four channels. Likewise, second portion 14 can transmit optical data signals on any of the four channels and receive optical data signals on any of the four channels. Accordingly, optical communication system 10 can be characterized as a full-duplex data communication system.

First portion first transceiver 16 includes two first light sources 28 and 30 and corresponding driver circuits 32 and 34. Light sources 28 and 30 can be, for example, vertical cavity surface-emitting lasers (VCSELs). Driver circuits 32 and 34 drive light sources 28 and 30, respectively, thereby causing them to produce optical data signals, in response to electrical data signals. First portion first transceiver 16 also includes two first light detectors 36 and 38 and corresponding receiver circuits 42 and 44. Light detectors 36 and 38 can be, for example, positive-intrinsic-negative (PIN) diode photodetectors. Receiver circuits 42 and 44 convert and amplify the outputs of light detectors 36 and 38, respectively, thereby producing electrical data signals, in response to optical data signals. Driver circuits 32 and 34 receive the electrical data signals from an electrical contact array 40. Receiver circuits 42 and 44 output other electrical data signals to electrical contact array 40. Optical elements 46 couple the optical transmit signals produced by light sources 28 and 30 into optical fiber 24. Similarly, optical elements 46 couple optical receive signals from optical fiber 24 into light detectors 36 and 38. Thus, first light sources 28 and 30 and corresponding driver circuits 32 and 34 provide electrical-to-optical signal conversion, while first light detectors 36 and 38 and corresponding receiver circuits 42 and 44 provide optical-to-electrical signal conversion.

First portion second transceiver 18 includes two second light sources 48 and 50 and corresponding driver circuits 52 and 54. Light sources 48 and 50 can be, for example, vertical cavity surface-emitting lasers (VCSELs). Driver circuits 52 and 54 drive light sources 48 and 50, respectively, thereby causing them to produce optical data signals, in response to electrical data signals. First portion second transceiver 18 also includes two second light detectors 56 and 58 and corresponding receiver circuits 62 and 64. Light detectors 56 and 58 can be, for example, PIN diode photodetectors. Receiver circuits 62 and 64 convert and amplify the outputs of light detectors 56 and 58, respectively, thereby producing electrical data signals, in response to optical data signals. Driver circuits 52 and 54 receive the electrical data signals from electrical contact array 60. Receiver circuits 62 and 64 output other electrical data signals to electrical contact array 60. Optical elements 66 couple the optical transmit signals produced by light sources 48 and 50 into optical fiber 26. Similarly, optical elements 66 couple optical receive signals from optical fiber 26 into light detectors 56 and 58. Thus, second light sources 48 and 50 and corresponding driver circuits 52 and 54 provide electrical-to-optical signal conversion, while second light detectors 56 and 58 and corresponding receiver circuits 62 and 64 provide optical-to-electrical signal conversion.

Each of light sources 28, 30, 48 and 50 corresponds to one of the four channels and is configured to emit an optical transmit signal having a unique transmit wavelength corresponding to that channel. That is, the transmit wavelength emitted by each of light sources 28, 30, 48 and 50 is different from the other transmit wavelengths emitted by the others of light sources 28, 30, 48 and 50. The wavelengths emitted by light sources 28, 30, 48 and 50 can be referred to for illustrative purposes as a first wavelength ($\lambda 1$), a second wavelength ($\lambda 2$), a third wavelength ($\lambda 3$), and a fourth wavelength ($\lambda 4$). Although in the exemplary embodiment first portion 12 of optical communication system 10 has four channels, embodiments can more generally have 2N channels, where N is a number indicating the number of light sources (e.g., two in the exemplary embodiment) in each of first and second transceivers 16 and 18. Note that 2N thus indicates the total number of channels (i.e., the number of transmit channels plus the number of receive channels) accommodated by each of first and second transceivers 16 and 18. Preferably, 2N is a power of two greater than or equal to four. Thus, although in the exemplary embodiment first portion 12 of optical communication system 10 has four channels, in other embodiments such an optical communication system alternatively can have, for example, eight, 16 or 32, etc., channels.

Each of light detectors 36, 38, 56 and 58 also corresponds to one of the four channels and is configured to be capable of detecting an optical receive signal having a unique receive wavelength corresponding to that channel. The wavelengths detectable by light detectors 56, 58, 36 and 38 are, respectively, the first wavelength ($\lambda 1$), the second wavelength ($\lambda 2$), the third wavelength ($\lambda 3$), and the fourth wavelength ($\lambda 4$).

Significantly, note that in first portion first transceiver 16, light sources 28 and 30 are configured to emit the first and second wavelengths, while light detectors 36 and 38 are configured to detect the third and fourth wavelengths. Likewise, note that in first portion second transceiver 18, light sources 48 and 50 are configured to emit the third and fourth wavelength, while light detectors 56 and 58 are configured to detect the first and second wavelengths. Stated another way, the transmit and receive wavelengths of first transceiver 16 and second transceiver 18 are complementary.

Second portion 14 of optical communication system 10 is identical to first portion 12 of optical communication system 10. Accordingly, second portion first transceiver 18' is identical to first portion second transceiver 18, and second portion second transceiver 16' is identical to first portion first transceiver 16. Note that the transmit and receive wavelengths of first transceiver 18' and second transceiver 16' are complementary.

As second portion first transceiver 18' is identical to first portion second transceiver 18, and second portion second transceiver 16' is identical to first portion first transceiver 16, their elements are not described in similar detail. Rather, it is sufficient to note that: light sources 28', 30', 48' and 50' are identical to light sources 28, 30, 48 and 50, respectively;

driver circuits 32', 34', 52' and 54' are identical to driver circuits 32, 34, 52 and 54, respectively; light detectors 36', 38', 56' and 58' are identical to light detectors 36, 38, 56 and 58, respectively; receiver circuits 42', 44', 62' and 64' are identical to receiver circuits 42, 44, 62 and 64, respectively; optical elements 46' and 66' are identical to optical elements 46 and 66, respectively; and electrical contact arrays 40' and 60' are identical to electrical contact arrays 40 and 60, respectively.

First portion first transceiver 16 is coupled via optical fiber 24 to second portion first transceiver 18', and first portion second transceiver 18 is coupled via optical fiber 26 to second portion second transceiver 16'. As described above, first portion first transceiver 16 can transmit optical data signals modulated on the first and second wavelengths and receive optical data signals modulated on the third and fourth wavelengths, while first portion second transceiver 18 can transmit optical data signals modulated on the third and fourth wavelengths and receive optical data signals modulated on the first and second wavelengths. Due to this complementary configuration of transmit and receive wavelengths, first portion first transceiver 16 can receive optical data signals modulated on the third and fourth wavelengths from second portion first transceiver 18', while second portion first transceiver 18' can receive optical data signals modulated on the first and second wavelengths from first portion first transceiver 16. Note that this arrangement of first portion first transceiver 16 and second portion first transceiver 18' defines half of a full-duplex optical data communication system. Conversely, first portion second transceiver 18 can receive optical data signals modulated on the first and second wavelengths from second portion second transceiver 16', while second portion second transceiver 16' can receive optical data signals modulated on the third and fourth wavelengths from first portion second transceiver 18. Note that this arrangement of first portion second transceiver 18 and second portion second transceiver 16' defines another half of a full-duplex optical data communication system, and that the entire optical data communication system 10 is accordingly full duplex. The significance of the above-described system in which each communicating transceiver pair uses complementary transmit and receive wavelengths will become apparent from the following.

Figure 2:
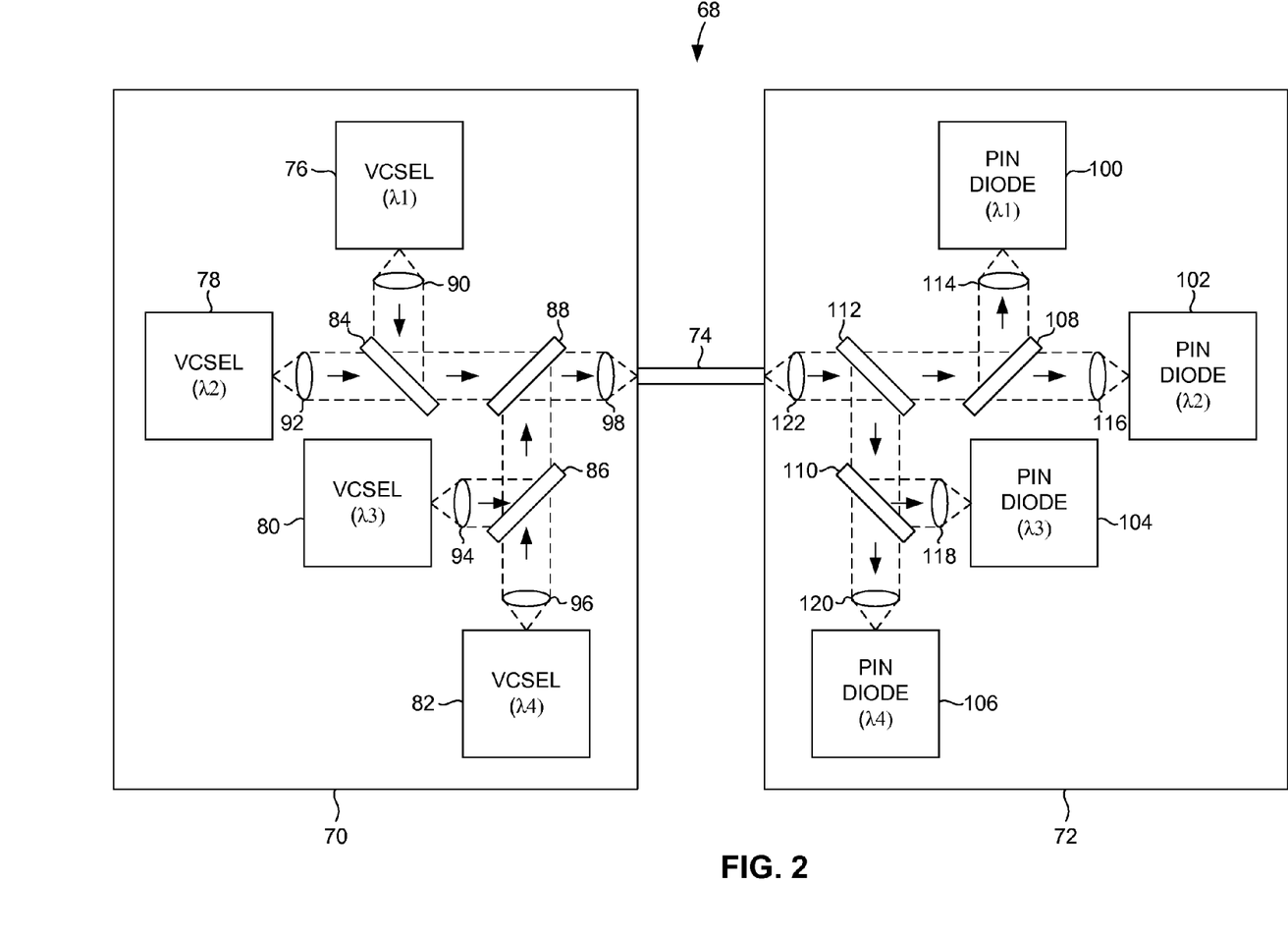
FIG. 2 is a schematic diagram of a transmitter and receiver of another optical communication system.

Consider the four-channel CWDM optical data communication system 68 shown in FIG. 2, which includes a transmitter 70 coupled to a receiver 72 by an optical fiber 74. Although not shown for purposes of clarity, such an optical data communication system can further include another receiver similar to receiver 72 that is co-located with transmitter 70, and another transmitter similar to transmitter 70 that is co-located with receiver 72, so that data can be transmitted and received on four channels between two locations.

Transmitter 70 includes four light sources 76, 78, 80 and 82, such as VCSELs, which can be mounted on a suitable substrate (not shown) such as a printed circuit board. Driver circuitry of the type commonly included in optical transmitters is included in transmitter 70 but not shown for purposes of clarity. Light sources 76, 78, 80 and 82 are configured to respectively emit a first wavelength ($\lambda$1), a second wavelength ($\lambda$2), a third wavelength ($\lambda$3), and a fourth wavelength ($\lambda$4). A first wavelength-selective filter 84, a second wavelength-selective filter 86, and a third wavelength-selective filter 88 direct the optical signals emitted by light sources 76, 78, 80 and 82 along respective optical transmit paths terminating at the entrance to optical fiber 74. The optical transmit and receive paths also include lenses 90, 92, 94, 96 and 98.

A first optical transmit path exists between light source 76 and optical fiber 74 via first wavelength-selective filter 84 and third wavelength-selective filter 88. First wavelength-selective filter 84 is substantially reflective to the first wavelength ($\lambda$1), and third wavelength-selective filter 88 is substantially transparent to the first wavelength. Accordingly, optical signals emitted by light source 76 are transmitted through lens 90 and are reflected by first wavelength-selective filter 84 toward third wavelength-selective filter 88. These optical signals that are reflected by first wavelength-selective filter 84 are transmitted through third wavelength-selective filter 88 and through lens 98 into the end of optical fiber 74.

A second optical transmit path exists between light source 78 and optical fiber 74 via first wavelength-selective filter 84 and third wavelength-selective filter 88. First wavelength-selective filter 84 is substantially transparent to the second wavelength ($\lambda$2), and third wavelength-selective filter 88 is substantially transparent to the second wavelength. Accordingly, optical signals emitted by light source 78 are transmitted through lens 92 and through first wavelength-selective filter 84 toward third wavelength-selective filter 88. These optical signals that are transmitted through first wavelength-selective filter 84 are further transmitted through third wavelength-selective filter 88 and through lens 98 into the end of optical fiber 74.

A third optical transmit path exists between light source 80 and optical fiber 74 via second wavelength-selective filter 86 and third wavelength-selective filter 88. Second wavelength-selective filter 86 is substantially reflective to the third wavelength ($\lambda$3), and third wavelength-selective filter 88 is substantially reflective to the third wavelength. Accordingly, optical signals emitted by light source 80 are transmitted through lens 94 and then reflected by second wavelength-selective filter 86 toward third wavelength-selective filter 88. These optical signals that are reflected by second wavelength-selective filter 86 are further reflected by third wavelength-selective filter 88 and through lens 98 into the end of optical fiber 74.

A fourth optical transmit path exists between light source 82 and optical fiber 74 via second wavelength-selective filter 86 and third wavelength-selective filter 88. Second wavelength-selective filter 86 is substantially transparent to the fourth wavelength ($\lambda$4), and third wavelength-selective filter 88 is substantially reflective to the fourth wavelength. Accordingly, optical signals emitted by light source 82 are transmitted through lens 94 and then transmitted through second wavelength-selective filter 86 toward third wavelength-selective filter 88. These optical signals that are transmitted through second wavelength-selective filter 86 are then reflected by third wavelength-selective filter 88 and through lens 98 into the end of optical fiber 74.

Transmitter 70 poses a potential manufacturing challenge. In a repetitive manufacturing process that uses known optoelectronic device manufacturing techniques, it would be difficult to consistently produce physical embodiments of transmitter 70 in which all four light sources 76, 78, 80 and 82 are optically aligned in their optical transmit paths with sufficient accuracy to allow transmitter 70 to operate properly, i.e., to reliably transmit data on each of the four channels. This consistency is commonly referred to in a manufacturing context as "yield." Stated another way, in a manufacturing process in which a certain number of devices are produced in the exact same manner as each other, it is desirable to maximize the proportion of those devices that operate properly (the remainder that do not operate properly being deemed defective or unusable for their intended purpose). Achieving sufficiently accurate optical alignment is challenging for a manufacturing process because VCSELs (i.e., light sources 76, 78, 80 and 82) have a small spot size and a large numerical aperture, and optical fiber 74 has a small acceptance angle. Deviation from alignment of any one of light sources 76, 78, 80 and 82 beyond a very small tolerance range (e.g., only a few microns) results in coupling loss that adversely impacts communications quality. If even only one out of the four light sources 76, 78, 80 and 82 is not aligned within the tolerance range, the entire transmitter 70 device is deemed defective and unusable, thereby impacting yield. For a manufacturing process to achieve alignment of all four light sources 76, 78, 80 and 82 within the tolerance range is roughly four times less likely than achieving alignment of only one such light source. Thus, the yield of a process for manufacturing the four-channel CWDM transmitter 70 could reasonably be expected to be only one-fourth the yield of a similar process used for manufacturing a single-channel optical transmitter. Embodiments of the present invention address this potential manufacturing challenge. Receiver 72 does not pose a similarly great challenge for the manufacturing process because PIN photodiodes have large active areas and wide optical acceptance angles and thus have wide tolerance to deviation of the optical signals from the optical path. Nevertheless, for the sake of completeness, receiver 72 is now described in similar detail to transmitter 70.

Receiver 72 includes four light detectors 100, 102, 104 and 106, such as PIN photodiodes, which can be mounted on a suitable substrate (not shown) such as a printed circuit board. Receiver circuitry of the type commonly included in optical receivers is included in receiver 72 but not shown for purposes of clarity. Light detectors 100, 102, 104 and 106 are configured to respectively detect the first wavelength ($\lambda 1$), the second wavelength ($\lambda 2$), the third wavelength ($\lambda 3$), and the fourth wavelength ($\lambda 4$). A first wavelength-selective filter 108, a second wavelength-selective filter 110, and a third wavelength-selective filter 112 direct the optical signals received through optical fiber 74 through respective optical receive paths to each of light detectors 100, 102, 104 and 106. The optical receive paths also include lenses 114, 116, 118, 120 and 122.

A first optical receive path exists between light detector 100 and optical fiber 74 via third wavelength-selective filter 112 and first wavelength-selective filter 108. Third wavelength-selective filter 112 is substantially transparent to the first wavelength ($\lambda 1$), and first wavelength-selective filter 108 is substantially reflective to the first wavelength. Accordingly, optical signals of the first wavelength emitted from the end of optical fiber 74 are transmitted through lens 122 and through third wavelength-selective filter 112 toward first wavelength-selective filter 108. These optical signals are then reflected by first wavelength-selective filter 108 and through lens 114 onto light detector 100.

A second optical receive path exists between light detector 102 and optical fiber 74 via third wavelength-selective filter 112 and first wavelength-selective filter 108. Third wavelength-selective filter 112 is substantially transparent to the second wavelength ($\lambda 2$), and first wavelength-selective filter 108 is substantially transparent to the second wavelength. Accordingly, optical signals of the second wavelength emitted from the end of optical fiber 74 are transmitted through lens 122 and through third wavelength-selective filter 112 toward first wavelength-selective filter 108. These optical signals are further transmitted through first wavelength-selective filter 108 and through lens 116 onto light detector 102.

A third optical receive path exists between light detector 104 and optical fiber 74 via third wavelength-selective filter 112 and second wavelength-selective filter 110. Third wavelength-selective filter 112 is substantially reflective to the third wavelength ($\lambda 3$), and second wavelength-selective filter 110 is substantially reflective to the third wavelength. Accordingly, optical signals of the third wavelength emitted from the end of optical fiber 74 are transmitted through lens 122 and then reflected by third wavelength-selective filter 112 toward second wavelength-selective filter 110. These optical signals are further reflected by second wavelength-selective filter 110 and through lens 118 onto light detector 104.

A fourth optical receive path exists between light detector 106 and optical fiber 74 via third wavelength-selective filter 112 and second wavelength-selective filter 110. Third wavelength-selective filter 112 is substantially reflective to the fourth wavelength ($\lambda 4$), and second wavelength-selective filter 110 is substantially transparent to the fourth wavelength. Accordingly, optical signals of the fourth wavelength emitted from the end of optical fiber 74 are transmitted through lens 122 and then reflected by third wavelength-selective filter 112 toward second wavelength-selective filter 110. These optical signals are then transmitted through second wavelength-selective filter 110 and through lens 120 onto light detector 106.

Optical communication system 10, described above with regard to FIG. 1, addresses the above-described manufacturing yield problem. First portion first transceiver 16 and second portion first transceiver 18' are shown in further detail in FIG. 3, while first portion second transceiver 18 and second portion second transceiver 16' are shown in further detail in FIG. 4. Electrical connector arrays 40, 60, 40' and 60', driver circuits 32, 34, 52, 54, 32', 34', 52' and 54', and receiver circuits 42, 44, 62, 64, 42', 44', 62' and 64' (FIG. 1) are not shown in FIGS. 3-4 for purposes of clarity.

Figure 3:
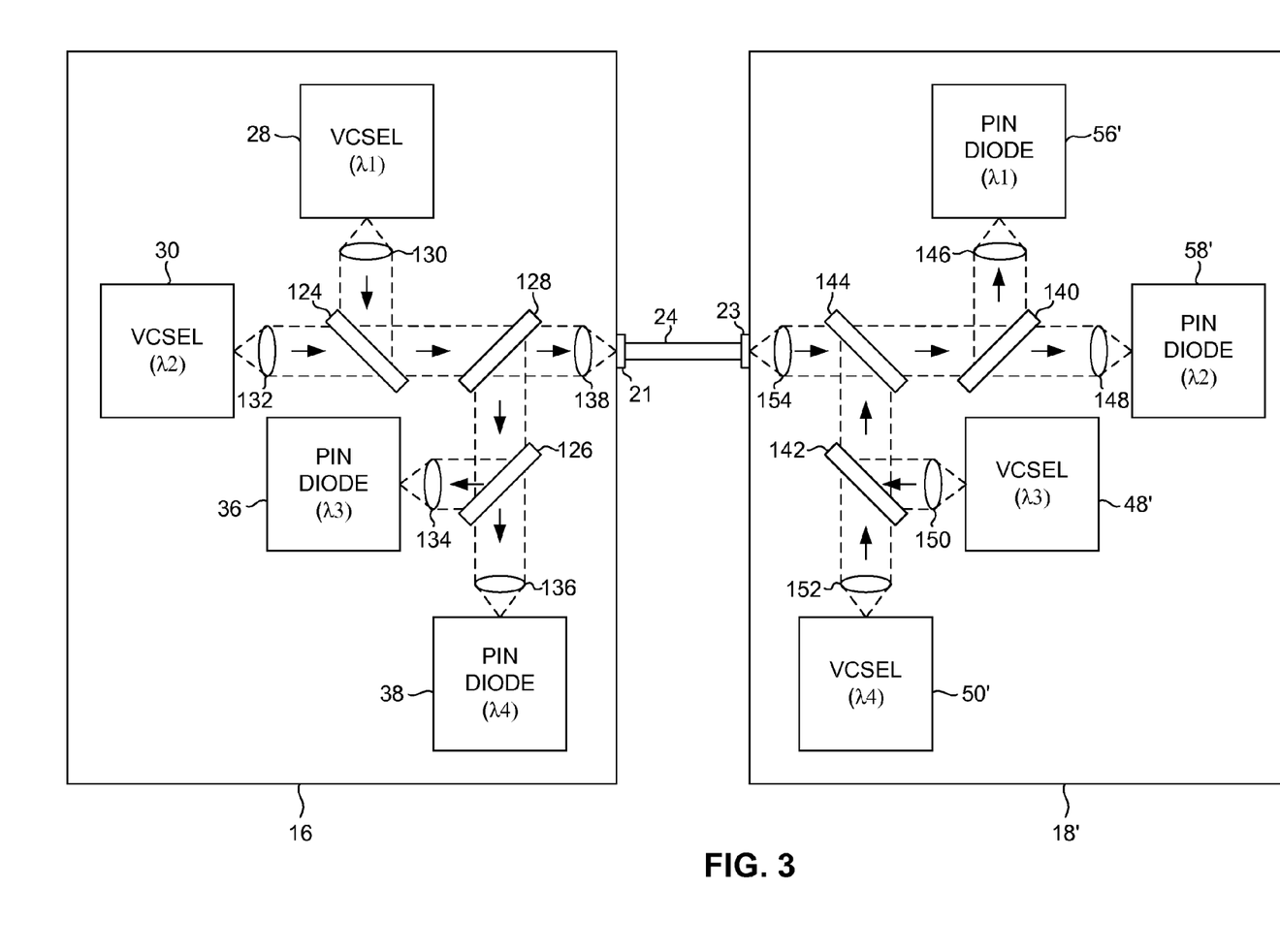
FIG. 3 is a schematic diagram of a transmitter and receiver of the exemplary optical communication system of FIG. 1.

As illustrated in FIG. 3, optical elements 46 (FIG. 1) of first portion first transceiver 16 includes, in addition to light sources 28 and 30 and light detectors 36 and 38, a first wavelength-selective filter 124, a second wavelength-selective filter 126, and a third wavelength-selective filter 128. First, second and third wavelength-selective filters 124-126 direct the optical signals emitted by light sources 28 and 30 along respective optical transmit paths terminating at a first end of optical fiber 24 and direct optical signals emitted from the first end of optical fiber 24 along respective optical receive paths terminating at respective ones of light detectors 36 and 38. Wavelength-selective filters 124, 126 and 128 can comprise, for example, thin-film dielectric coatings on a glass or similarly optically transparent substrate. Wavelength-selective filters 124, 126 and 128 can be of a high-pass filter or low-pass filter type. The optical paths also include lenses 130, 132, 134, 136 and 138. Light sources 28 and 30, which can be VCSELs, and light detectors 36 and 38, which can be PIN photodiodes, can be mounted on a suitable substrate (not shown) such as a printed circuit board.

In first portion first transceiver 16, a first optical transmit path exists between light source 28 and optical fiber 24 via first wavelength-selective filter 124 and third wavelength-selective filter 128. First wavelength-selective filter 124 is substantially reflective to the first wavelength ($\lambda 1$), and third wavelength-selective filter 128 is substantially transparent to the first wavelength ($\lambda 1$). Accordingly, optical signals emitted by light source 28 are transmitted through lens 130 and are reflected by first wavelength-selective filter 124 toward third wavelength-selective filter 128. These optical signals that are reflected by first wavelength-selective filter 124 are transmitted through third wavelength-selective filter 128 and through lens 138 into the end of optical fiber 74.

In first portion first transceiver 16, a second optical transmit path exists between light source 30 and optical fiber 24 via first wavelength-selective filter 124 and third wavelength-selective filter 128. First wavelength-selective filter 124 is substantially transparent to the second wavelength ($\lambda 2$), and third wavelength-selective filter 128 is substantially transparent to the second wavelength (λ2). Accordingly, optical signals emitted by light source 30 are transmitted through lens 132 and through first wavelength-selective filter 124 toward third wavelength-selective filter 128. These optical signals that are transmitted through first wavelength-selective filter 124 are further transmitted through third wavelength-selective filter 128 and through lens 138 into the end of optical fiber 24.

In first portion first transceiver 16, a first optical receive path exists between light detector 36 and optical fiber 24 via third wavelength-selective filter 128 and second wavelength-selective filter 126. Third wavelength-selective filter 128 is substantially reflective to the third wavelength (λ3), and second wavelength-selective filter 126 is substantially reflective to the third wavelength (λ3). Accordingly, optical signals of the third wavelength emitted from the end of optical fiber 24 are transmitted through lens 138 and then reflected by third wavelength-selective filter 128 toward second wavelength-selective filter 126. These optical signals are further reflected by second wavelength-selective filter 126 and through lens 134 onto light detector 36.

In first portion first transceiver 16, a second optical receive path exists between light detector 38 and optical fiber 24 via third wavelength-selective filter 128 and second wavelength-selective filter 126. Third wavelength-selective filter 128 is substantially reflective to the fourth wavelength (λ4), and second wavelength-selective filter 126 is substantially transparent to the fourth wavelength (λ4). Accordingly, optical signals of the fourth wavelength emitted from the end of optical fiber 24 are transmitted through lens 138 and then reflected by third wavelength-selective filter 128 toward second wavelength-selective filter 126. These optical signals are then transmitted through second wavelength-selective filter 126 and through lens 136 onto light detector 38.

Although in the exemplary embodiment wavelength-selective filters 124, 126 and 128 are aligned at 45-degree angles with respect to the optical paths, in other embodiments such wavelength-selective filters can be aligned at any other suitable angle with respect to one or more optical paths. Also, in other embodiments the optical paths in such a first transceiver can include more or fewer optical elements than in the exemplary first portion first transceiver 16 shown in FIG. 3, such as additional lenses, reflectors, etc. The optical paths in such other embodiments thus can have configurations other than those shown in FIG. 3, such as additional turns, zig-zags, etc.

As further illustrated in FIG. 3, optical elements 66' (FIG. 1) of second portion first transceiver 18' includes, in addition to light sources 48' and 50' and light detectors 56' and 58', a first wavelength-selective filter 140, a second wavelength-selective filter 142, and a third wavelength-selective filter 144. First through third wavelength-selective filters 140-144 direct the optical signals emitted by light sources 48' and 50' along respective optical transmit paths terminating at the second end of optical fiber 24 and direct optical signals emitted from the second end of optical fiber 24 along respective optical receive paths terminating at respective ones of light detectors 56' and 58'. Wavelength-selective filters 140, 142 and 144 can comprise, for example, thin-film dielectric coatings on a glass or similarly optically transparent substrate. Wavelength-selective filters 140, 142 and 144 can be of a high-pass filter or low-pass filter type. The optical paths also include lenses 146, 148, 150, 152 and 154. Light sources 48' and 50', which can be VCSELs, and light detectors 56' and 58', which can be PIN photodiodes, can be mounted on a suitable substrate (not shown) such as a printed circuit board.

In second portion first transceiver 18', a first optical transmit path exists between light source 48' and optical fiber 24 via second wavelength-selective filter 142 and third wavelength-selective filter 144. Second wavelength-selective filter 142 is substantially reflective to the third wavelength (λ3), and third wavelength-selective filter 144 is substantially reflective to the third wavelength. Accordingly, optical signals emitted by light source 48' are transmitted through lens 150 and are reflected by second wavelength-selective filter 142 toward third wavelength-selective filter 144. These optical signals that are reflected by second wavelength-selective filter 142 are further reflected by third wavelength-selective filter 144 and through lens 154 into the end of optical fiber 24.

In second portion first transceiver 18', a second optical transmit path exists between light source 50' and optical fiber 24 via second wavelength-selective filter 142 and third wavelength-selective filter 144. Second wavelength-selective filter 142 is substantially transparent to the fourth wavelength (λ4), and third wavelength-selective filter 144 is substantially reflective to the fourth wavelength. Accordingly, optical signals emitted by light source 50' are transmitted through lens 152 and through second wavelength-selective filter 142 toward third wavelength-selective filter 144. These optical signals that are transmitted through second wavelength-selective filter 142 are reflected by third wavelength-selective filter 144 and through lens 154 into the end of optical fiber 24.

In second portion first transceiver 18', a first optical receive path exists between light detector 56' and optical fiber 24 via third wavelength-selective filter 144 and first wavelength-selective filter 140. Third wavelength-selective filter 144 is substantially transparent to the first wavelength (λ1), and first wavelength-selective filter 140 is substantially reflective to the first wavelength. Accordingly, optical signals of the first wavelength emitted from the end of optical fiber 24 are transmitted through lens 154 and through third wavelength-selective filter 144 toward first wavelength-selective filter 140. These optical signals are further reflected by first wavelength-selective filter 140 and through lens 146 onto light detector 56'.

In second portion first transceiver 18', a second optical receive path exists between light detector 58' and optical fiber 24 via third wavelength-selective filter 144 and first wavelength-selective filter 140. Third wavelength-selective filter 144 is substantially transparent to the second wavelength (λ2), and first wavelength-selective filter 140 is substantially transparent to the second wavelength. Accordingly, optical signals of the second wavelength emitted from the end of optical fiber 24 are transmitted through lens 154 and through third wavelength-selective filter 144 toward first wavelength-selective filter 140. These optical signals are then transmitted through first wavelength-selective filter 140 and through lens 148 onto light detector 58'.

Although in the exemplary embodiment wavelength-selective filters 140, 142 and 144 are aligned at 45-degree angles to the optical paths, in other embodiments such wavelength-selective filters can be aligned at any other angle to one or more optical paths. Also, in other embodiments the optical paths in such a first transceiver can include more or fewer optical elements than in the exemplary second portion first transceiver 18' shown in FIG. 3, such as additional lenses, reflectors, etc. The optical paths in such other embodiments thus can have configurations other than those shown in FIG. 3, such as additional turns, zig-zags, etc.

Figure 4:
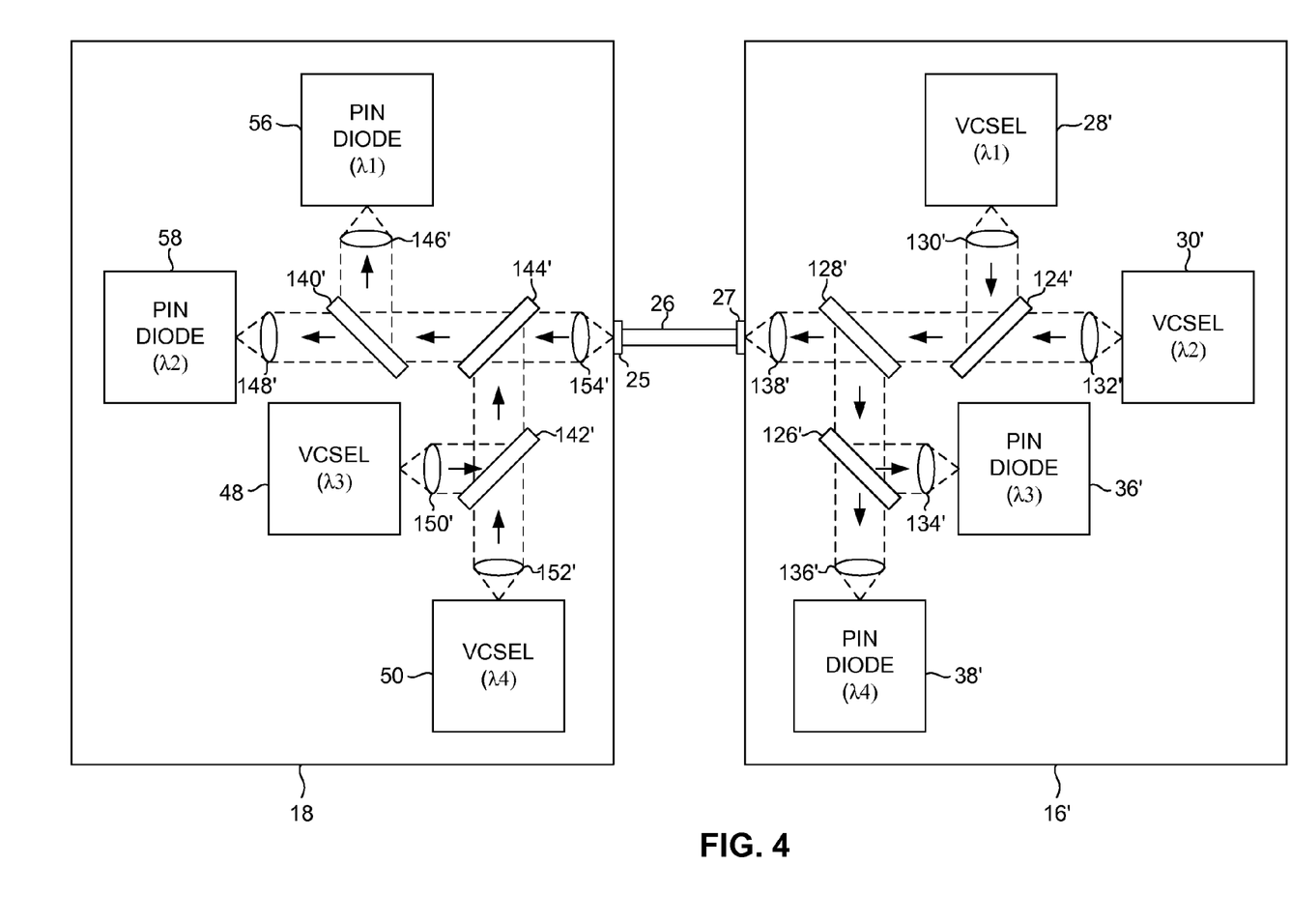
FIG. 4 is a schematic diagram of another transmitter and receiver of the exemplary optical communication system of FIG. 1.

First portion second transceiver 18 and second portion second transceiver 16' are illustrated in further detail in FIG. 4. As first portion second transceiver 18 is identical to above-described second portion first transceiver 18', its elements and operation are not described in similar detail. Rather, it is sufficient to note that: first through third wavelength-selective filters 140', 142' and 144' are identical to above-described first through third wavelength-selective filters 140, 142 and 144, respectively, and lenses 146', 148', 150', 152' and 154' are identical to above-described lenses 146, 148, 150, 152 and 154. The optical transmit paths and optical receive paths through first portion second transceiver 18 are identical to the above-described optical transmit and receive paths through second portion first transceiver 18'. Likewise, as second portion second transceiver 16' is identical to above-described first portion first transceiver 16, its elements and operation are not described in similar detail. Rather, it is sufficient to note that: first through third wavelength-selective filters 124', 126' and 128' are identical to above-described first through third wavelength-selective filters 124, 126 and 128, respectively, and lenses 130', 132', 134', 136' and 138' are identical to above-described lenses 130, 132, 134, 136 and 138. The optical transmit paths and optical receive paths through second portion second transceiver 16' are identical to the above-described optical transmit and receive paths through first portion first transceiver 16.

A number of characteristics of the exemplary optical communication system 10 can be noted. First, it can be noted in FIG. 3 that first portion first transceiver 16 includes only two light sources 28 and 30, and second portion first transceiver 18' includes only two light sources 48' and 50', yet first portion first transceiver 16 and second portion first transceiver 18' communicate a total of four channels of optical signals bidirectionally via optical fiber 24. That is, from the perspective of first portion first transceiver 16 there are two transmit channels, one corresponding to the first wavelength (λ1) and the other corresponding to the second wavelength (λ2), plus two receive channels, one corresponding to the third wavelength (λ3) and the other corresponding to the fourth wavelength (λ4), thus totaling four (transit and receive) channels. Similarly, from the perspective of second portion first transceiver 18' there are two transmit channels, one corresponding to the third wavelength (λ3) and the other corresponding to the fourth wavelength (λ4), plus two receive channels, one corresponding to the first wavelength (λ1) and the other corresponding to the second wavelength (λ2), thus totaling four (transit and receive) channels. First portion first transceiver 16 and second portion first transceiver 18' configured in the above-described manner to communicate optical signals bidirectionally with each other via optical fiber 24 defines on half of a full-duplex communication link. A full-duplex communication link is defined by first portion first transceiver 16 and second portion first transceiver 18' configured in the above-describe manner to communicate optical signals bidirectionally with each other via optical fiber 24 in combination with first portion second transceiver 18 and second portion second transceiver 16' configured in the above-describe manner to communicate optical signals bidirectionally with each other via optical fiber 26.

Second, but significantly, it can be noted that although optical communication system 10 (FIGS. 1, 3 and 4) has four channels, each of transceivers 16 and 18 (and thus also each of transceivers 16' and 18') potentially can be manufactured with higher yield than transmitter 70 of the four-channel optical communication system 68 described above with regard to FIG. 2. As described above, current manufacturing processes cannot consistently (i.e., with high yield) produce physical embodiments of transmitter 70 in which all four light sources 76, 78, 80 and 82 are aligned within the tolerance required to enable transmitter 70 to operate properly. In contrast, current manufacturing processes have the potential to consistently (i.e., with high yield) produce physical embodiments of transceivers 16 and 18 (and thus transceivers 16' and 18') because there are only half as many light sources in each of transceivers 16 and 18 as in transmitter 70. Again, note that although there are only half as many light sources in each of transceivers 16 and 18 as in transmitter 70, each of transceivers 16 and 18 handles just as many communication channels as transmitter 70 handles (i.e., four).

Third, it can be noted that the above-described configuration of transceivers 16 and 18 helps minimize insertion loss. As each of the wavelength-selective filters is either a high-pass filter or a low-pass filter, each wavelength-selective filter can readily either split the optical signals that are incident upon it from a single direction into two directions or, alternatively, combine optical signals that are incident upon it from two directions into a single direction. Accordingly, in a transceiver having N light sources and N light detectors, an optical transmit signal following a transmit path from a light source to the optical fiber or an optical receive signal following a receive path from the optical fiber to a light detector interacts with (i.e., is either transmitted through or reflected by) no more than $\log_2(N)+1$ wavelength-selective high-pass or low-pass filters. Minimizing the number of optical elements in a transmit path or receive path helps minimize insertion loss. Furthermore, high-pass and low-pass wavelength-selective filters are more economical and have wider alignment tolerance than narrow bandpass filters.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein without deviating from the goals of the invention, and all such modifications are within the scope of the invention.

What is claimed is:

1. An optical transceiver, comprising:

N first light sources, each first light source of the N first light sources corresponding to a separate transmit channel and configured to emit an optical transmit signal having a transmit wavelength different from all other transmit wavelengths of the N first light sources;

N first light detectors, each first light detector of the N first light detectors corresponding to a separate receive channel and configured to detect an optical receive signal having a receive wavelength different from all other receive wavelengths of the N first light detectors, where 2N is a power of two greater than or equal to four indicating a total number of transmit channels of the N first light sources and receive channels of the N first light detectors;

a first bidirectional optical fiber port connectable to a first optical fiber; and a first optical network including 2N−1 wavelength-selective optical elements, the optical network coupling each first light source of the N first light sources to the first bidirectional optical fiber port via a corresponding transmit path comprising not more than $\log_2(N)+1$ wavelength-selective optical elements and coupling each first light detector of the N first light detectors to the first bidirectional optical fiber port via a corresponding receive path comprising not more than $\log_2(N)+1$ wavelength-selective optical elements.

2. The optical transceiver of claim 1, wherein each of the 2N−1 wavelength-selective optical elements of the first optical network is one of a high-pass filter and a low-pass filter.

3. The optical transceiver of claim 1, wherein each of the 2N−1 wavelength-selective optical elements of the first optical network includes a substrate and a thin-film wavelength-selective dielectric coating.

4. The optical transceiver of claim 1, wherein each transmit path of the first optical network comprises the same wavelength-selective optical elements.

5. The optical transceiver of claim 1, wherein:
each of the 2N−1 wavelength-selective optical elements of the first optical network is one of a high-pass filter and a low-pass filter; and
each transmit path of the first optical network comprises the same wavelength-selective optical elements.

6. The optical transceiver of claim 1, further comprising:
N second light sources, each second light source of the N second light sources corresponding to a separate transmit channel and configured to emit an optical transmit signal having a transmit wavelength different from all other transmit wavelengths of the N second light sources and the N first light sources, and the same as a receive wavelength of one of the N first light detectors, where 2N further indicates a total number of second transmit channels and second receive channels;
N second light detectors, each second light detector of the N second light detectors corresponding to a separate receive channel and configured to detect an optical receive signal having a receive wavelength different from all other receive wavelengths of the N second light detectors and the N first light detectors, and the same as a transmit wavelength of one of the N first light sources;
a second bidirectional optical fiber port connectable to a second optical fiber; and
a second optical network including 2N−1 wavelength-selective optical elements, the second optical network coupling each second light source of the N second light sources to the second bidirectional optical fiber port via a corresponding transmit path and coupling each second light detector of the N second light detectors to the bidirectional optical fiber port via a corresponding receive path.

7. The optical transceiver of claim 6, wherein each of the 2N−1 wavelength-selective optical elements of the second optical network is one of a high-pass filter and a low-pass filter.

8. The optical transceiver of claim 6, wherein each of the 2N−1 wavelength-selective optical elements of the second optical network includes a substrate and a thin-film wavelength-selective dielectric coating.

9. The optical transceiver of claim 6, wherein each transmit path of the second optical network includes wavelength-selective optical elements not more than $\log_2(N)+1$ in number.

10. The optical transceiver of claim 6, wherein:
each of the 2N−1 wavelength-selective optical elements of the second optical network is one of a high-pass filter and a low-pass filter; and
each transmit path of the second optical network includes wavelength-selective optical elements not more than $\log_2(N)+1$ in number.

11. A method for optical communication in an optical transceiver module, the optical transceiver module comprising N first light sources, N first light detectors, a first bidirectional optical fiber port, and a first optical network having 2N−1 wavelength-selective optical elements, where 2N is a power of two greater than or equal to four indicating a number of transmit and receive channels, the method comprising:
each first light source of the N first light sources emitting an optical transmit signal corresponding to a separate transmit channel and having a transmit wavelength different from all other transmit wavelengths of the N first light sources;
each first light detector of the N first light detectors detecting an optical receive signal corresponding to a separate receive channel and having a receive wavelength different from all other receive wavelengths of the N first light detectors;
each of the N optical transmit signals propagating through the first optical network from the corresponding one of the N first light sources to the first bidirectional optical fiber port via a corresponding transmit path of the optical network path comprising not more than $1+\log_2(N)$ wavelength-selective optical elements;
transmitting each of the N optical transmit signals from the first bidirectional optical fiber port via a first optical fiber coupled to the first bidirectional optical fiber port;
receiving each of the N optical receive signals at the first bidirectional optical fiber port via the first optical fiber coupled to the first bidirectional optical fiber port; and
each of the N optical receive signals propagating through the first optical network from the first bidirectional optical fiber port to the corresponding one of the N first light detectors via a corresponding receive path of the first optical network path comprising not more than $1+\log_2(N)$ wavelength-selective optical elements.

12. The method of claim 11, wherein each of the 2N−1 wavelength-selective optical elements of the first optical network is one of a high-pass filter and a low-pass filter.

13. The method of claim 11, wherein each of the 2N−1 wavelength-selective optical elements of the first optical network includes a substrate and a thin-film wavelength-selective dielectric coating.

14. The method of claim 11, wherein each transmit path of the first optical network comprises the same wavelength-selective optical elements.

15. The method of claim 11, wherein:
each of the 2N−1 wavelength-selective optical elements of the first optical network is one of a high-pass filter and a low-pass filter; and
each transmit path of the first optical network comprises the same wavelength-selective optical elements.

16. The method of claim 11, wherein the optical transceiver module further comprises N second light sources, N second light detectors, a second bidirectional optical fiber port, and a second optical network having 2N−1 wavelength-selective optical elements, and wherein the method further comprises:
each second light source of the N second light sources emitting an optical transmit signal corresponding to a separate transmit channel and having a transmit wavelength different from all other transmit wavelengths of the N second light sources and the N first light sources, and the same as a receive wavelength of one of the N first light detectors;
each second light detector of the N second light detectors detecting an optical receive signal corresponding to a separate receive channel and having a receive wavelength different from all other receive wavelengths of the N second light detectors and the N first light detectors, and the same as a transmit wavelength of one of the N first light sources;
each of the N optical transmit signals propagating through the second optical network from the corresponding one of the N second light sources to the bidirectional optical fiber port via a corresponding transmit path of the second optical network;

transmitting each of the N optical transmit signals from the second bidirectional optical fiber port via a second optical fiber coupled to the second bidirectional optical fiber port;

receiving each of the N optical receive signals at the second bidirectional optical fiber port via the second optical fiber coupled to the second bidirectional optical fiber port; and each of the N optical receive signals propagating through the second optical network from the second bidirectional optical fiber port to the corresponding one of the N second light detectors via a corresponding receive path of the second optical network.

17. The method of claim 16, wherein each of the 2N−1 wavelength-selective optical elements of the second optical network is one of a high-pass filter and a low-pass filter.

18. The method of claim 16, wherein each of the 2N−1 wavelength-selective optical elements of the second optical network includes a substrate and a thin-film wavelength-selective dielectric coating.

19. The method of claim 16, wherein each transmit path of the second optical network includes wavelength-selective optical elements not more than $\log_2(N)+1$ in number.

20. The method of claim 16, wherein:

each of the 2N−1 wavelength-selective optical elements of the second optical network is one of a high-pass filter and a low-pass filter; and each transmit path of the second optical network includes wavelength-selective optical elements not more than $\log_2(N)+1$ in number.

* * * * *